United States Patent
Chu et al.

(10) Patent No.: US 10,554,251 B1
(45) Date of Patent: Feb. 4, 2020

(54) LOW POWER WAKE UP RADIO SYNCHRONIZATION WITH LOW POWER ANTENNA

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/977,490

(22) Filed: May 11, 2018

Related U.S. Application Data

(60) Provisional application No. 62/505,426, filed on May 12, 2017, provisional application No. 62/635,407, filed on Feb. 26, 2018.

(51) Int. Cl.
  *H04B 1/7156* (2011.01)
  *H04W 52/02* (2009.01)
  *H04M 1/725* (2006.01)

(52) U.S. Cl.
  CPC ...... *H04B 1/7156* (2013.01); *H04M 1/72505* (2013.01); *H04W 52/0225* (2013.01)

(58) Field of Classification Search
  CPC ... H04W 84/12; H04W 4/80; H04W 52/0225; H04W 52/02; H04W 56/00; H04W 56/001; H04W 8/245; H04W 72/1215
  See application file for complete search history.

(56) References Cited

U.S. PATENT DOCUMENTS

| | | | | |
|---|---|---|---|---|
| 7,546,149 | B2 * | 6/2009 | Aerrabotu | H04W 52/0216 455/574 |
| 2014/0314068 | A1 * | 10/2014 | Wentink | H04W 56/001 370/350 |
| 2015/0245282 | A1 * | 8/2015 | Kim | H04W 48/14 370/338 |
| 2018/0020410 | A1 * | 1/2018 | Park | H04W 52/0235 |

OTHER PUBLICATIONS

Chu, et al., "Frame Exchange of STAs With Low Power Antenna", U.S. Appl. No. 15/382,441, filed Dec. 16, 2016.

Zhang, et al., "Techniques for Implementing Low Power (LP) Wakeup in a Wireless Network", U.S. Appl. No. 62/489,800, filed Apr. 25, 2017.

\* cited by examiner

*Primary Examiner* — Keith Ferguson

(57) ABSTRACT

A first wireless device determines, while a first and second wireless transceiver are powered off, start of a service period. The first wireless transceiver is turned on in response to the determination to enable the first wireless device to establish communication via a LP wireless channel while the second wireless transceiver is off. The first wireless device receives a request frame from a second wireless device and a time of a timing function is updated based on the request frame.

20 Claims, 9 Drawing Sheets

LP Wakeup Request Frame ns to implement frame exchange between wireless devices, such as wireless stations (STAs) and access points (APs). The techniques disclosed within this disclosure can also be used in wireless networks that employ long-range low-power (LRLP) wireless communication technologies mentioned herein.

LOW POWER WAKE UP RADIO SYNCHRONIZATION WITH LOW POWER ANTENNA

CROSS REFERENCE TO RELATED APPLICATION

This disclosure claims the benefit of priority of U.S. Provisional Application Ser. No. 62/505,426 filed May 12, 2017, entitled, "LOW POWER WAKEUP RADIO (WUR) SYNCHRONIZATION" and U.S. Provisional Application Ser. No. 62/635,407 filed Feb. 26, 2018, entitled, "TIMING SYNCHRONIZATION FUNCTION (TSF) TIME IN LOW POWER SYNC", the contents each of which is incorporated herein by reference in its entirety.

FIELD OF USE

This disclosure relates to wireless networking systems and techniques, namely employing low-power (LP) antennas to implement frame exchange between wireless devices, such as wireless stations (STAs) and access points (APs). The techniques disclosed within this disclosure can also be used in wireless networks that employ long-range low-power (LRLP) wireless communication technologies mentioned herein.

BACKGROUND

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 can be used to provide close-proximity wireless connectivity between wireless devices. As an example, WiFi routers operating on a traditional 2.4 GHz band can reach up to 150 feet (46 m) indoors and 300 feet (92 m) outdoors. Newer long range low power (LRLP) wireless networking technologies, such as IEEE 802.11ah, have also been developed to operate at longer ranges and lower power. These LRLP wireless technologies extend the communication range of legacy IEEE 802.11 wireless technologies, for example, by approximately 10 dB and distance by approximately 500 m and have comparatively lower device power consumption.

SUMMARY

This disclosure relates to wireless networking systems and techniques, namely timing synchronization between wireless devices, such as STAs and APs in wireless networks that employ LRLP wireless communication technologies mentioned herein.

According to an aspect of the described system and techniques, a method comprises determining, by a first wireless device and while a first and second wireless transceiver are powered off, start of a service period (SP) interval based on a timing function; turning on the first wireless transceiver in response to the determination of the start of the service period to enable the first wireless device to establish communication with a second wireless device via a low power (LP) wireless channel while the second wireless transceiver is powered off; receiving, by the first wireless device, a request frame from the second wireless device; and updating a time of the timing function based on the request frame.

According to an aspect of the described system and techniques, an apparatus comprises: a local timing function; a processor; memory; program code stored in the memory and executable by the processor to perform one or more functions which include: based on the local timing function, determining start of a service period (SP) interval at a wireless device, wherein the wireless device powers on a first wireless transceiver of the wireless device in response to the start of the service period interval to enable the wireless device to establish communication with the apparatus via a low power (LP) wireless channel while a second wireless transceiver of the wireless device is powered off; sending a request frame to the wireless device to cause the wireless device to update a time of a remote timing function associated with the wireless device based on the request frame.

According to yet another aspect of the described system and techniques, an apparatus comprises a first wireless transceiver; a second wireless transceiver; circuitry configured to: determine, by a first wireless device and while a first and second wireless transceiver are powered off, start of a service period (SP) interval based on a timing function; turn on the first wireless transceiver in response to the determination of the start of the service period to enable the first wireless device to establish communication with a second wireless device via a low power (LP) wireless channel while the second wireless transceiver is powered off; receive, by the first wireless device, a request frame from the second wireless device; and update a time of the timing function based on a time in a timing function time field of the request frame.

In this regard, mechanisms are provided for maintaining synchronization of timing synchronization functions (TSF) associated with an STA and AP that indicate when a transceiver of the STA is powered off to save power.

BRIEF DESCRIPTION OF THE DRAWINGS

Like reference symbols in the various drawings indicate like elements.

DETAILED DESCRIPTION

This disclosure provides examples and details for synchronizing timing between wireless devices such as wireless stations (STAs) and access points (APs) employing low-power (LP) antennas.

Figure 1:
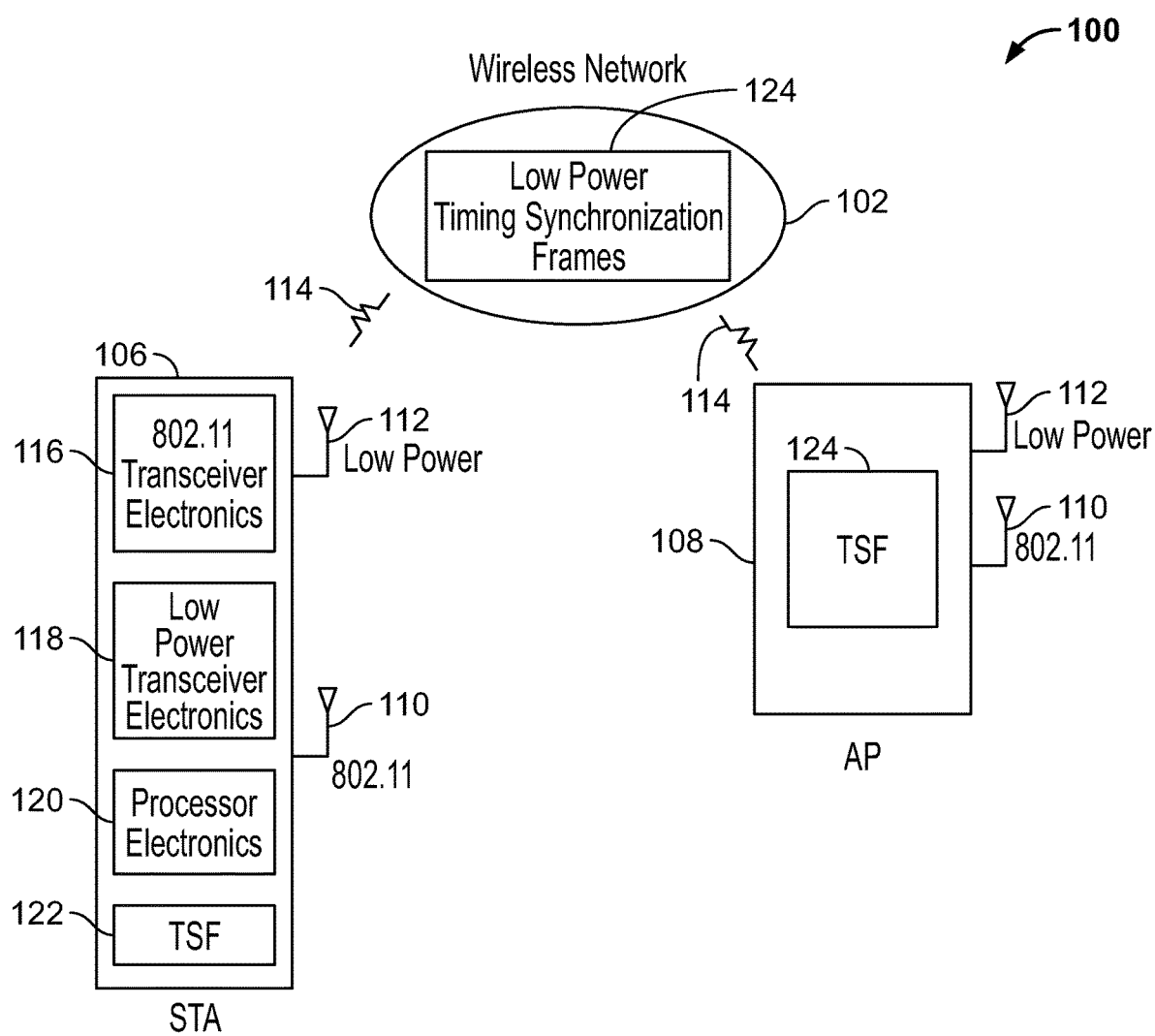
FIG. 1 shows an example of a wireless communication system arranged to facilitate low power (LP) communication.

FIG. 1 shows an example of a wireless communication system 100. The wireless communication system 100 implements LRLP wireless communication technologies, which focus on long range and power efficiency. The wireless communication system 100 is usable to implement an IoT architecture among others according to the Institute of Electrical and Electronics Engineers (IEEE) 802.11ah communication standard. The wireless communication system 100 operating in accordance with the IEEE 802.11ah communication standard achieves lower power requirements with a lower frequency, resulting in a larger effective range than legacy WiFi standards, which operate at 2.4 GHz and 5 GHz frequencies.

The wireless communication system 100 includes a wireless network 102 such as a WLAN and one or more wireless devices. The wireless devices may take the form a wireless station (STA) 106 and access point (AP) 108.

The STA 106 and AP 108 may be configured to include two distinct wireless antennas: a high power wireless antenna 110 usable for wireless communications 114 at standard legacy 802.11 WiFi network frequencies (e.g., 2.4 GHz and 5 GHz frequencies); and a LP antenna 112 using LRLP networking technologies to establish wireless communication 114 at low power. As an example, a LP antenna 112 utilizes low power wireless communication channels to operate at frequencies associated with LRLP network capabilities (e.g., 900 MHz). In some implementations, the LP antenna 112 is also capable of supporting communication using legacy 802.11 WiFi network frequencies, for example, in an additional mode of operation. The antennas 110, 112 are used to communicate between the wireless devices, such as STA and AP and other components of the wireless communication system 100. The high power antenna 110 and LP antenna 112 are illustrated as separate antennas, but in some examples, the high power antenna 110 and LP antenna 112 may be a same antenna.

AP 108 can be connected to additional network devices, such as routers and modems, for example, to further connect wireless devices to a wide area network (WAN), such as the Internet. The AP 108 can be employed to register STAs, such as STA 106, thereby allowing the wireless devices to receive wireless communication services. The wireless communication system 100 can includes multiple STAs and APs. In some implementations, AP 108 implements direct communications between the STA, such as point-to-point communication, where a channel is allocated for the devices to communicate directly. Likewise, the STAs, such as STA 106 can also implement direct communications with one or more other wireless communication devices and/or the AP 108.

The STA 106 includes circuitry that can be understood in three main parts: 802.11 transceiver electronics 116 (also referred to herein as a "802.11 radio" or "0.11" radio) to send and receive wireless signals over one or more 802.11 (e.g., high power) antennas 110; low power transceiver electronics 118 (also referred to herein as an "LP radio" which can be compliant with 802.11 but operates at a lower power) to send and receive wireless signals over one or more LP antennas 112, and processor electronics 120 to effect the wireless communications using the 802.11 transceiver electronics 116 and low power transceiver electronics 118. The STA 106 communicates with the AP 108 via its LP antenna 112 and 802.11 antenna 110. In this regard, the AP 108 may have also similar electronics (not shown) for enabling the LP antenna 112 and 802.11 antenna 110 on the AP 108 to transmit and/or receive wireless signals.

The LP transceiver electronics 118 enable transmission and/or reception of wireless signals via low power wireless communication channels using LPLR protocols such as IEEE 802.11ah. Similarly, the 802.11 transceiver electronics 116 enable transmission and/or reception of wireless signals via legacy 802.11 WiFi communication channels. The processor electronics 120 can include one or more processors, such as a digital baseband processor and one or more additional dedicated processing units (e.g., a power management unit and audio codec) to coordinate operation of the 802.11 transceiver electronics 116 and low power transceiver electronics 118. As an example, the processor electronics 120 can include a Digital Signal Processor (DSP), a MicroController Unit (MCU), at least one memory device, or any combination thereof.

The STA 106 may turn off (e.g., power off) its the 802.11 transceiver electronics 116 and LP transceiver electronics 118 to save power based on one or more timers associated with the STA 106. Each of the one or more timers may be a clock which counts in increments/decrements based on a clocking mechanism. The one or more timers are used to track when the 802.11 transceiver electronics 116 and LP transceiver electronics 118 are powered on or turned on (e.g., capable of transmitting and/or receiving signals via the low power antenna 112 and/or 802.11 antenna 110) or powered off or turned off (e.g., not capable of transmitting and/or receiving signals via the low power antenna 112 and/or 802.11 antenna 110). The one or more timers may take the form of a timing synchronization function (TSF) defined by 802.11 (also referred to as timing function). The STA 106 may have a TSF 122. The TSF 122 may take the form of two separate TSFs, one for keeping track of when the 802.11 transceiver 116 is on or off (referred to as an 0.11 TSF) and one for keeping track of when the LP transceiver electronics 118 is on and off (referred to as an LP TSF). The 0.11 TSF may be 8 octets with 1 microsecond of granularity while the LP TSF may be 6 or 8 octets with 1 or 4 microseconds of granularity. The AP 108 may also maintain a TSF 124. The TSF 124 may take the form of a 0.11 TSF and LP TSF with same octet and granularity which is synchronized to the corresponding 0.11 TSF and LP TSF on the STA.

The TSF 122, 124 associated with the AP 108 and STA 106 may be further synchronized. LP timing synchronization frames 124 as discussed in further detail below are exchanged between the AP 108 and STA 106 to facilitate this synchronization so that both the AP 108 and STA 106 know when the other's 802.11 transceiver electronics 116 and LP transceiver electronics 118 are on and off so that wireless signals can be transmitted and received via the wireless network 102.

Figure 2:
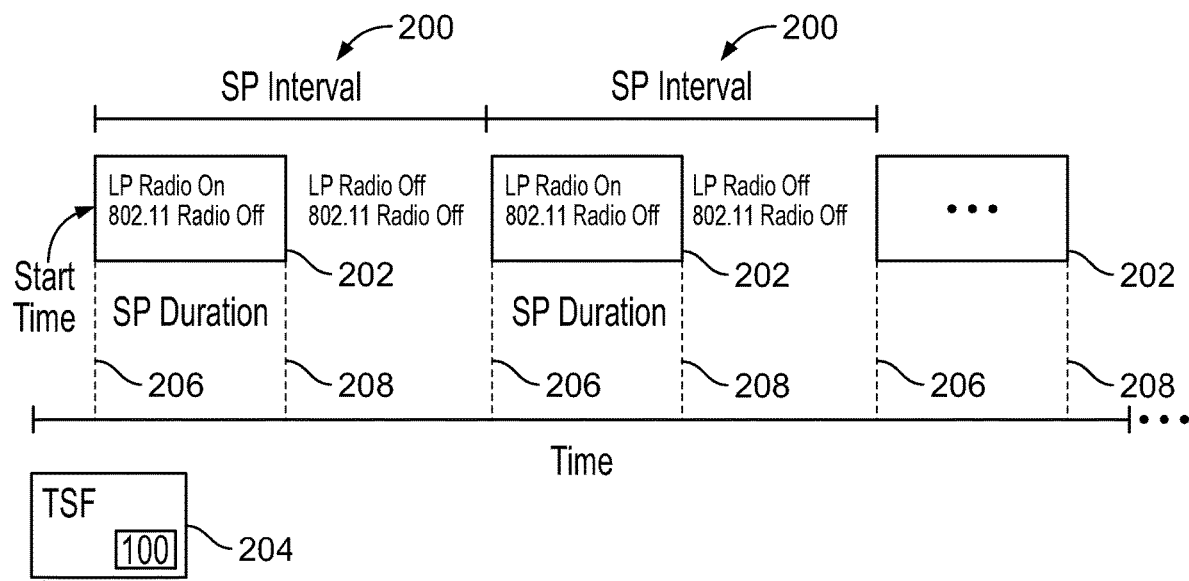
FIG. 2 illustrates an example service period (SP) interval.

FIG. 2 illustrates an example service period (SP) interval 200 associated with the STA. The SP 200 interval defines a service period (SP) duration 202 during which the LP radio is initially off but turned on (e.g., awake) and the 0.11 radio is off (e.g., in sleep mode where parts of device are switched off and not consuming power) unless it is turned on during the SP duration 202. When the LP radio is on, the STA may be able to transmit and/or receive information over a LP wireless channel. When the LP radio is off, the STA may not be able to transmit and/or receive information over the LP wireless channel. The 0.11 radio may be turned on (e.g., awake) during the SP duration 202 as a result of receipt of a LP wakeup frame while the LP radio is on as described in more detail below. When the 802.11 radio is on, the STA may be able to transmit and/or receive information over an 802.11 wireless channel. Outside of this SP duration 202 during the service period (SP) 200 interval, the LP radio and the 0.11 radio may be off (e.g., both in sleep mode where parts of device are switched off and not consuming power).

A TSF 204, i.e., LP TSF, associated with the STA may indicate a start time 206 of the SP duration 202 and an end time 208 of the SP duration 202. Based on the start time 206 of the SP duration 202, the STA may turn on the LP radio while the 802.11 radio is off. Then, when the LP TSF associated with the STA indicates the end time 208 of the SP duration 202, the STA may turn off the LP radio and 802.11 radio to save power. This process may be repeated for a plurality of SP intervals 200. In this regard, the LP TSF 204 may also indicate one or more of the start/end times 206, 208 of the plurality of SP intervals 200 similar to how the start/end of the SP duration 202 is indicated.

The one or more parameters associated with when the 0.11 radio and/or LP radio is on or off may be negotiated between the AP and STA. For example, the SP interval 200, SP duration 202, and start time 206 of the SP duration may be negotiated between the AP and STA. The negotiation may be a frame exchange via the 802.11 radio, e.g., using an 802.11 management frame. Alternatively, the parameters may be announced by the AP to the STA via the 802.11 radio. The announcement may be included in legacy 802.11 frames such as beacons transmitted by the AP, probes transmitted by the AP, or an association process between the AP and STA. The announcement may be broadcast to a plurality of STAs which are to use the same SP interval 200 and/or SP duration 202 for communication over the LP wireless channel or unicast to a specific STA.

Further, the LP TSF associated with the STA and AP may be synchronized. The AP may transmit to the STA an announcement, i.e., frame, with the LP TSF time at the AP via the LP radio. Additionally, or alternatively, the AP may transmit to the STA an announcement, i.e., frame, with the LP TSF time at the AP via the 802.11 radio. The STA may adjust its LP TSF time to be synchronized to that of the AP based on the LP TSF time indicated in the announcement. For example, the STA may replace the LP TSF time of the LP TSF at the STA with the LP TSF time indicated in the announcement. Alternatively, LP TSF time may be announced in terms of a 0.11 TSF time and difference between the LP TSF time and 0.11 TSF time at the AP. The STA may calculate the LP TSF time at the AP based on the announcement and adjust its LP TSF time to be synchronized to that of the AP based on the announcement. The STA may then turn on and off its 0.11 radio and/or LP radio in accordance with the LP TSF and negotiated SP interval 200, SP duration 202, and/or start time 206. The AP will then communicate with the STA via the LP radio when it determines that the LP radio at the STA is on based on its synchronized LP TSF.

The time indicated by the LP TSF at the AP and STA may drift over time and no longer be synchronized with each other after the initial synchronization. The times may not be synchronized when the LP TSF time at the AP is not indicative of the LP TSF time at the STA (there is an unknown difference in time). This may be due to temperature change, clock quality, stability of a power source, etc. To resynchronize the LP TSFs, the AP may trigger a resynchronization so that the LP TSF time at the AP and STA are synchronized again.

Figure 3:
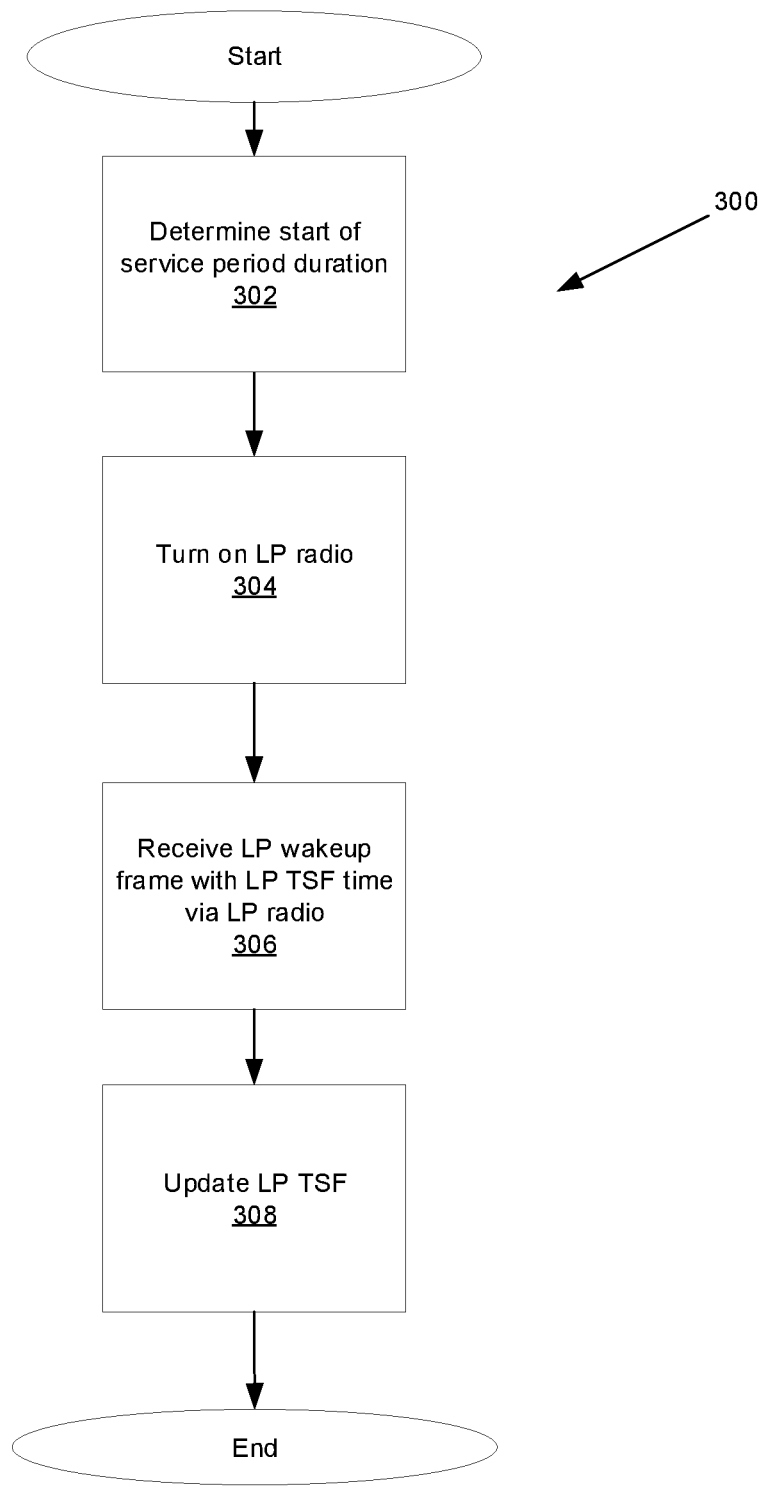
FIG. 3 shows an example process for implementing LP timing synchronization.

FIG. 3 shows an example process 300 for implementing timing synchronization of the TSF associated with the STA and AP. For example, process 300 may be performed by the STA 106. At 302, a start of SP duration may be determined by the STA 106. The LP TSF at the STA 106 may indicate a current time. Further, the SP duration may be associated with a start time when the SP duration begins. The start of the SP duration may be detected when the current time on the LP TSF at the STA matches the start time. At 304, the STA 106 may turn on its LP radio based on the determination. The 802.11 radio may remain off.

In some examples, the STA may turn on its LP radio for reasons other than based on the start of the SP duration. Subsequent processing is not limited by the means by which the LP radio is turned on.

While the LP radio is on, the AP can transmit via its LP radio and the STA can receive via its LP radio a low power trigger. The AP may know that the STA has turned on its LP radio based on the LP TSF at the AP indicating the start of the SP duration, i.e., start of the SP duration may be detected by the AP when the current time on the LP TSF at the AP also matches the start time. The AP is configured to transmit the low power trigger using its LP antenna during the time that the LP radio on the STA is on to communicate with the STA, for example to transmit data frames and perform TSF synchronization. The low power trigger may take the form of an LP wakeup frame sent by the AP to the STA while the LP radio of the STA is on. The LP wakeup frame may indicate the LP TSF time at AP when the LP wakeup frame was sent. In some examples, the LP wakeup frame may be sent periodically by the AP based on a negotiation between the AP and STA. The negotiation may be a frame exchange via the 802.11 radio.

Figure 4:
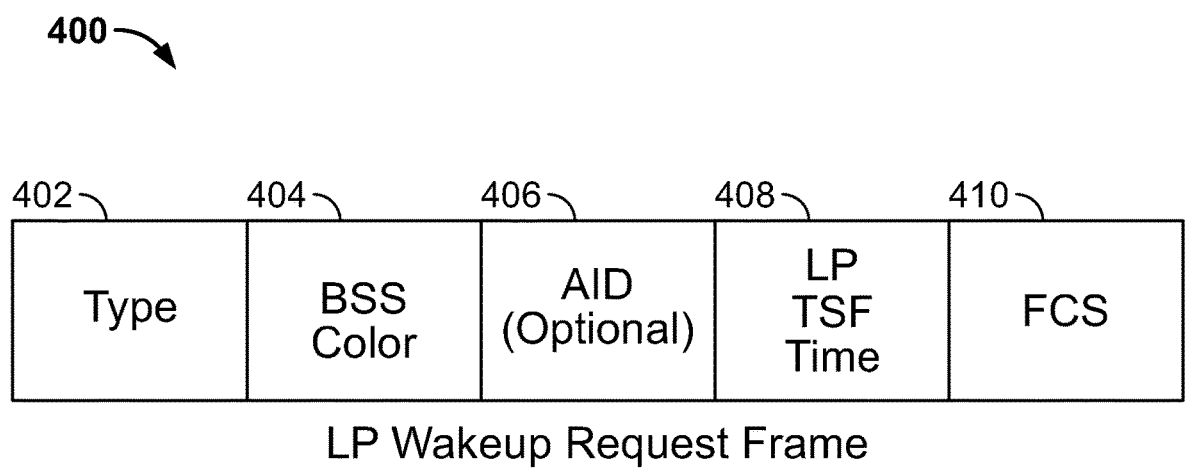
FIG. 4 shows an example an LP wakeup radio frame for implementing LP timing synchronization.

FIG. 4 shows an example an LP wakeup frame 400 for implementing timing synchronization. The LP wakeup frame 400 may include a plurality of fields 402-410. A type field 402 may indicate that the frame is an LP wakeup frame which defines a TSF time of the AP. A basic service set (BSS) color field 404 may identify the AP and connected STAs associated with the AP. The LP TSF field 408 may indicate a LP TSF time at the AP. The LP TSF time may be a 64 bit field which matches the length of the LP TSF time at the AP and STA. In other examples as described in further detail below, the LP TSF time may be a partial time value of 64 bit field, e.g. 12-bit, 24-bit, 32-bit partial TSF time. A frame check sequence (FCS) 410 provides error checking for the LP wakeup frame 400. In the case that the LP radio frame is not broadcast but rather unicast to an STA, the LP wakeup frame 400 may also have an association identifier (AID) 406 which identifies the STA to which the LP wakeup frame 400 is unicast. If the LP frame is broadcast, the LP wakeup radio will not have the AID field 406.

Referring back to FIG. 3, at 306, the STA 106 may receive the LP wakeup request frame via the LP radio and extract the LP TSF time in the LP TSF field. After receiving the LP TSF time, at 308, the STA 106 may adjust its LP TSF. The STA may adjust its LP TSF with the TSF time. The adjustment may include replacing the time of the LP TSF of the STA with the LP TSF time in the TSF field. In some cases, the LP TSF time may be adjusted for a known transmission delay between the AP and STA.

The low power trigger may also cause activation, or powering on, of the 802.11 radio by the STA to allow the AP to transmit frames to the STA via the 802.11 radio. The frames may include an announcement frame such as an 802.11 Action frame which contains the LP TSF time at the AP. The LP TSF time may be announced as the LP TSF time at the AP or as the 0.11 TSF time and a difference between the LP TSF time and 0.11 TSF time at the AP, among others. The STA may also receive this frame via its 802.11 radio and adjust its LP TSF time based on the LP TSF time in the frame.

Figure 5:
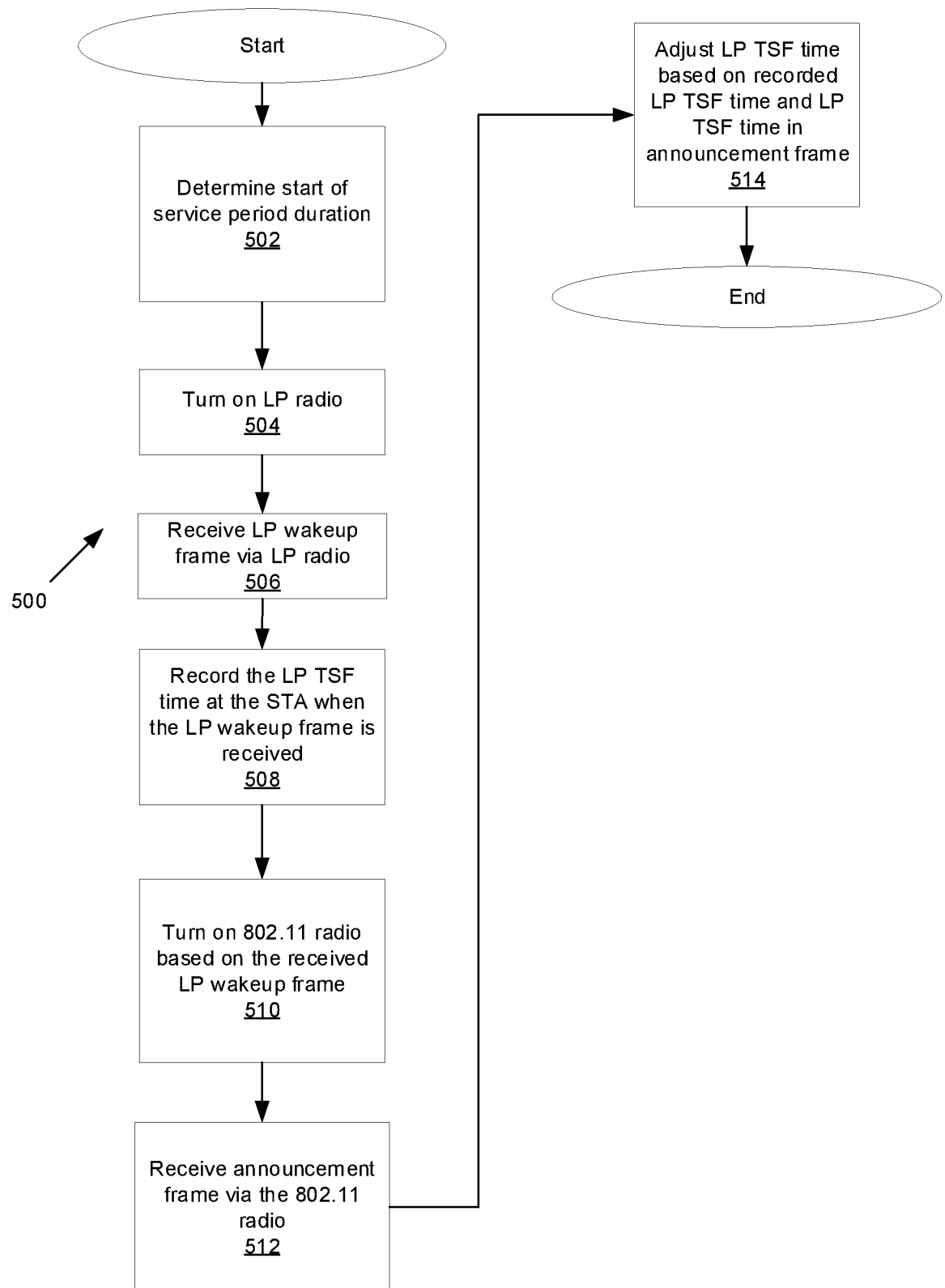
FIG. 5 shows another example process for implementing LP timing synchronization.

FIG. 5 shows an example process 500 for implementing timing synchronization. For example, process 500 may be performed by the STA 106. At 502, a start of the SP duration may be determined by the STA 106 and at 504, the STA 106 may turn on its LP radio based on the determination. During the SP duration, the AP can transmit and the STA can receive a low power trigger via the LP radio. The AP is configured to transmit the low power trigger using its LP antenna during the time that the LP radio on the STA is activated to communicate with the STA. The low power trigger may take the form of an LP wakeup frame sent from the AP to the STA while the LP radio is powered on.

Figure 6:
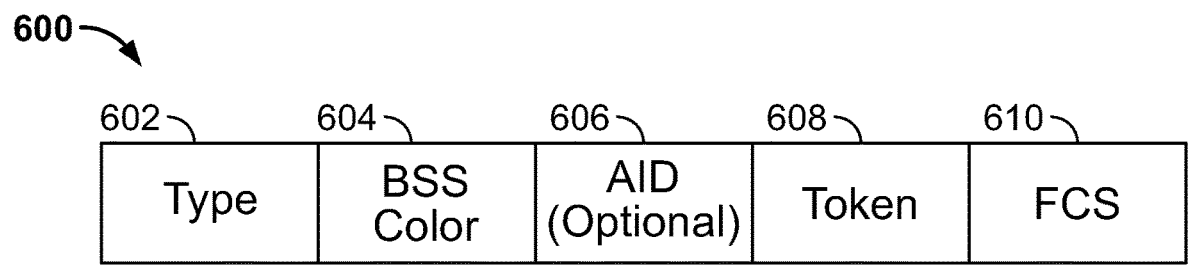
FIG. 6 shows an example a token-based LP wakeup radio frame for implementing LP timing synchronization.

FIG. 6 shows an example of the LP wakeup frame 600 in this example. The LP wakeup frame 600 may include one or more fields 602-610. A type field 602 may indicate that the frame is an LP wakeup frame and that an announcement frame which includes an LP TSF time when the LP wakeup frame was transmitted will follow. A basic service set (BSS) color field 604 may indicate the AP and connected STAs to the AP. A token field 608 may be used to associate the LP wakeup frame with the announcement frame which is to follow. A frame check sequence (FCS) 610 provides error checking for the LP wakeup radio frame 600. In the case that the LP wakeup frame 600 is not broadcast but rather unicast to an STA, the LP wakeup frame 600 may also have an association identifier (AID) field 606 which identifies the STA to which the LP wakeup frame is unicast. If the LP frame is broadcast, the LP wakeup radio may not have the AID field 606 or identify the AP in the AID field 606.

Referring back, at 506, the STA 106 receives the LP wakeup frame via the LP radio. At 508, the STA 106 may record the LP TSF time at the STA when the LP wakeup frame is received. At 510, the STA 106 turns on its 802.11 radio based on the received LP wakeup frame. At 512, the STA 106 receives an announcement frame via its 802.11 radio. The announcement frame may be unicast if the LP wakeup frame is unicast and broadcast if the LP wakeup frame is broadcast. The announcement frame may indicate a token and an LP TSF time. The token may be copied over from the LP wakeup frame. In this regard, the token in the LP wakeup frame matches a token in the announcement frame to indicate that the LP wakeup frame is related to the announcement frame. Alternatively, the token in the announcement frame does not match that in the LP wakeup frame but the token in the announcement frame is deterministically related to the token in the LP wakeup frame. In either case, it can be confirmed that the announcement frame is associated with the LP wakeup frame and if the token in the announcement frame is not related to the token in the LP wakeup frame, the announcement frame is ignored.

At 514, the STA 106 adjusts its LP TSF time based on a difference calculated between the LP TSF time indicated in the announcement frame and the LP TSF time recorded when the LP wakeup frame was received. When a next LP wakeup frame is sent, the token in the LP wakeup frame and corresponding announcement frame may be adjusted, e.g., incremented or decremented. This way the STA may not record a TSF time for an LP wakeup frame with one token value and use announcement frame with another token value in updating the LP TSF time.

Figure 7:
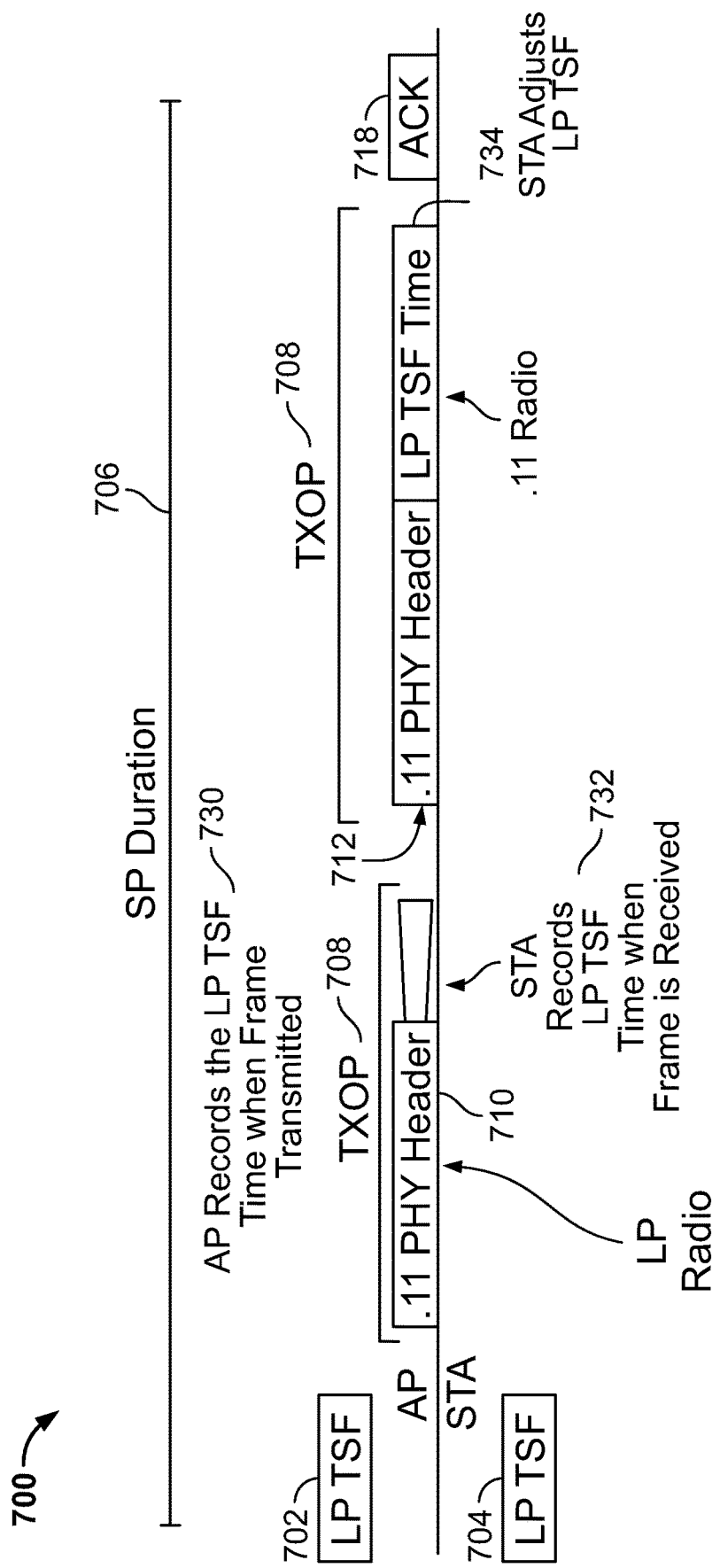
FIG. 7 shows a message flow diagram for the process implementing LP timing synchronization.

FIG. 7 shows a message flow diagram 700 for the process implementing timing synchronization based on transmission of a LP wakeup frame and corresponding announcement frame from the AP to the STA. The AP and STA each maintains a LP TSF 702, 704 for determining start of the SP duration when the LP radio of the STA is powered on. During the SP duration 706 and within a transmit opportunity 708, the AP transmits an LP wakeup frame 710 with an 802.11 PHY header to the STA when the LP radio of the STA is on, and records an LP TSF time 730 at the AP when the LP wakeup frame 710 is transmitted. The STA receives the LP wakeup frame 710. The STA may record a LP TSF time 732 at the STA when the LP wakeup frame 710 is received. At a later time, the AP may transmit an announcement frame 712 also with an 802.11 PHY header which includes the LP TSF time 716 recorded by the AP. This announcement frame 712 which may be unicast or broadcast is transmitted during a transmit opportunity 708 for receipt by the 802.11 radio of the STA which was woken up by the LP wakeup frame 710. The STA may adjust its LP TSF time at 734 based on a difference between the recorded time when the LP wakeup frame 710 is received and the TSF time 716 in the announcement frame 712 so that the times are synchronized. For instance, the STA may decrease the LP TSF time at the LP TSF 704 by the difference if the difference is negative and increase the LP TSF time at the LP TSF 704 by the difference if the difference is positive. In some cases, the LP TSF time at the STA may be also adjusted by a transmission delay between the AP and STA. Both the LP wakeup frame 710 and the announcement frame 712 may be sent in a same SP duration 706 before the LP radio and 802.11 radio are powered off until the next SP interval. In some cases, the STA may then send an acknowledgement frame 718 via the 802.11 radio to the AP to acknowledge receipt of the announcement frame.

Figure 8:
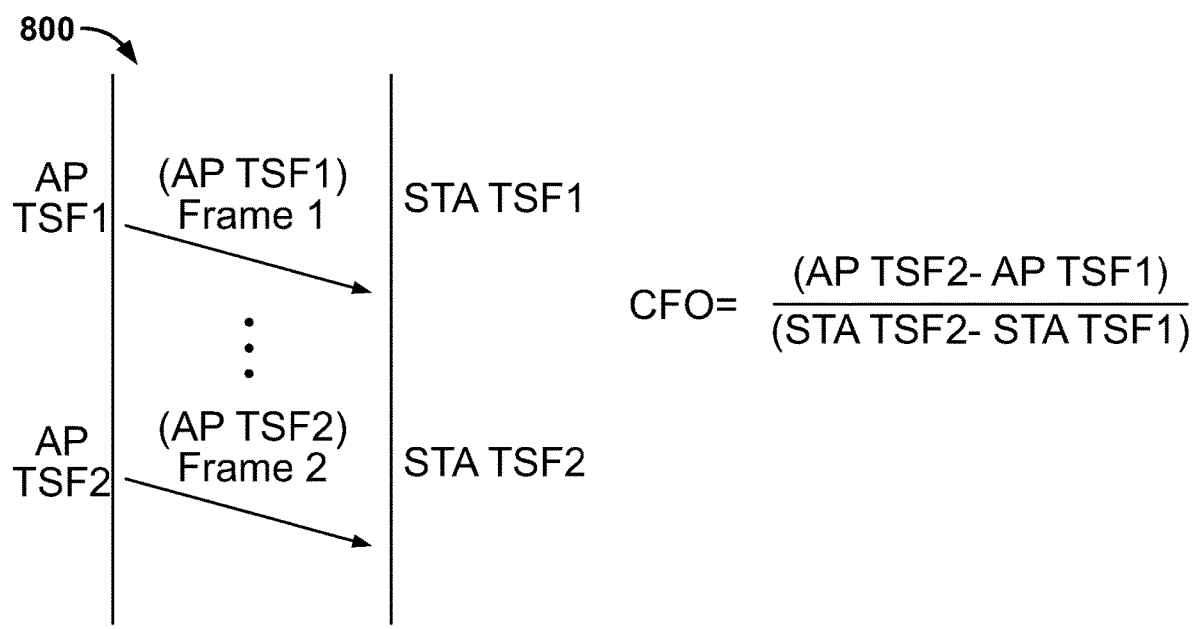
FIG. 8 shows an example timing diagram for implementing LP timing synchronization.

FIG. 8 shows an alternative timing synchronization process 800 which involves an update to the increment of the LP TSF rather than an update to the time of the LP TSF at the STA. The AP may send a frame defining an TSF time when the frame is sent (AP TSF1). This frame may take the form of the LP wakeup frame with TSF sent via the LP radio, announcement frame sent via the 802.11 radio, beacon etc. The STA may record a time when the frame is received based on its TSF (STA TSF 1). The AP may send another frame defining a TSF time when the frame is sent (AP TSF 2) and the STA may record its TSF time when the frame is received (STA TSF2). A ratio is calculated based on the differences by the following expression):

$$\text{Ratio} = (\text{AP TSF2} - \text{AP TSF1})/(\text{STA TSF2} - \text{STA TSF 1})$$

Then, an increment of the timer associated with the LP TSF is adjusted by the ratio rather the adjustment to actual LP TSF time described above. For example, instead of the timer being incremented by 1 each clock cycle, the timer may be incremented by 1*CFO to resynchronize the LP TSF at the STA with that of the AP.

The LP wakeup frame may be transmitted periodically. In some cases, the STA may lose synchronization with the AP such that it does not receive an LP wakeup frame in one or more SP durations. The STA may maintain a count of a number of SP durations where the STA does not receive the LP wakeup frame. The reason that the STA may not receive the LP wakeup frame may be that the LP TSF time at the STA may not be synchronized with LP TSF time at the AP such that the LP radio at the STA may be on, but the AP may think it is off and/or the LP radio at the STA may be off, but the AP may think it is on and send the LP wakeup frame. In either case, a LP wireless channel cannot be established between the AP and STA. In this situation, when the LP radio is already on, the STA may power on its 802.11 radio and send a resynchronization request to the AP via the 802.11 radio. The AP will then responsively send an LP wakeup frame with the TSF time and/or an announcement of the LP TSF time associated with the AP. The STA may adjust its LP TSF to resynchronize with the LP TSF associated with the AP.

In some examples, the STA may maintain a single TSF such as a 0.11 TSF rather than a separate 0.11 TSF and LP TSF. The 0.11 TSF may be used to keep track of when the 802.11 transceiver 116 and LP transceiver 118 is to be on and off. The STA may not have a separate LP TSF. The SP interval, start time, and SP duration may be negotiated and/or based on the 0.11 TSF time using the 0.11 radio. Further, the 0.11 TSF at the AP and STA would need to be synchronized in a manner similar to how the LP TSF is synchronized. The process for synchronization is the same as described above, but instead a 0.11 TSF time is used to synchronize a 0.11 TSF rather than a LP TSF time used to synchronize a LP TSF.

To illustrate, the AP may send an announcement of the 0.11 TSF time (rather than announcement of an LP TSF time) to the STA to achieve synchronization of the 0.11 TSF at the STA and AP. Additionally, or alternatively, the AP may insert an 0.11 TSF time rather than a LP TSF time in the LP wakeup frame in FIG. 4 which the STA will use to adjust its 0.11 TSF similar to how the LP TSF is adjusted above. Still additionally, or alternatively, the AP may record an 0.11 TSF time at the AP when an LP wakeup frame is sent similar to FIG. 6, the STA may record the 0.11 TSF time at the STA when the LP wakeup frame is received, the AP may insert the recorded 0.11 TSF time into the announcement which follows the LP wakeup frame, and the STA will adjust its 0.11 TSF time similar to how the LP TSF time is adjusted above but based on the 0.11 TSF time. Additionally, or alternatively, the ratio described with respect to FIG. 8 may be calculated based on 0.11 TSF time rather than a LP TSF time to synchronize the 0.11 TSF at the STA with the 0.11 TSF at the AP. Other variations are also possible.

In some examples, a sync frame such as the LP wakeup request frame, announcement frame, or any other frame which carries a TSF time, may have a partial TSF time. The partial TSF time may a portion of the bits of the TSF at the AP. For example, the TSF time may be 64 bits but the TSF time included in the LP wakeup request frame show in FIG. 4 may be 12 bits, such as bits 0 to 11 of the TSF or bits 4 to 15 of the TSF. The partial TSF in the LP wakeup request frame may replace corresponding bits in the TSF associated with the STA. For example, bits 0 to 11 of the TSF associated with the STA would be replaced with the partial TSF time in the LP wakeup request frame. But in some instances, the TSF associated with the STA may not still be synchronized because the TSF associated with the STA is faster or slower than the TSF associated with the AP. To illustrate, an AP's TSF time may be a combination of a most significant part, e.g., 52-bit X and a least significant 12 bit FF0 which is put into a sync frame such as the LP wakeup request frame. When the STA receives the sync frame the most significant part might be X+1 which is different from X. As a result, the TSF of the STA may be a combination of the most significant part which is X+1 and the least significant 12 bit FF0 which is received in the sync frame. The combination is different from the TSF associated with the AP and thus the two clocks are not synchronized.

Figure 9:
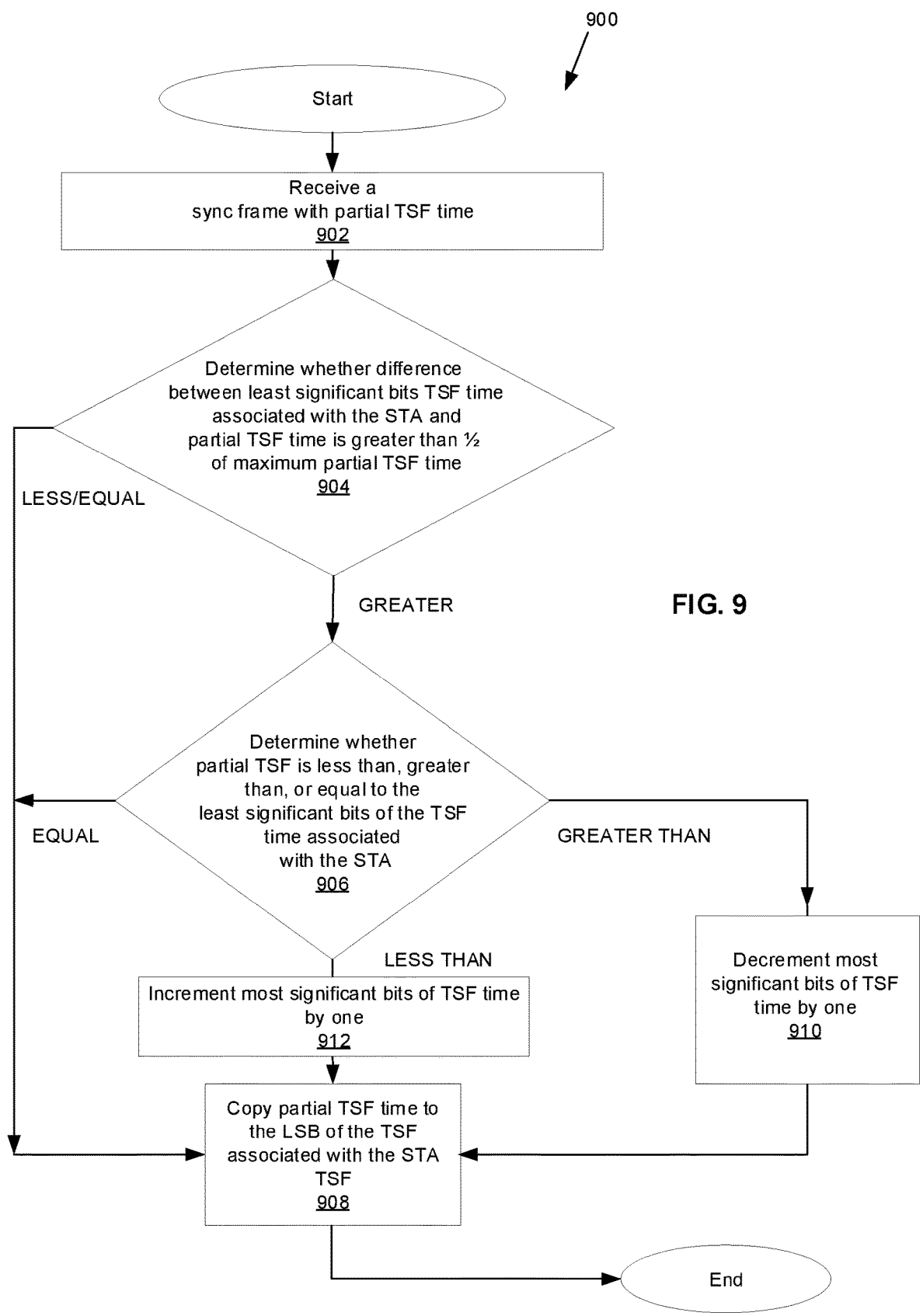
FIG. 9 is a flow diagram of functions 900 associated with exchange of a sync frame with a partial timing synchronization (TSF) time.

FIG. 9 is a flow diagram of functions 900 for maintaining synchronization between TSFs associated with the STA and AP when a sync frame such the low power wakeup frame has a partial TSF time. For example, the functions 900 may be performed by the STA 106. The partial TSF time in the sync frame may correspond to a subset of the bits in the TSF associated with the AP. For example, the TSF associated with the AP may be 64 bits, and partial TSF time may be the 12 LSB of the TSF associated with the AP. The TSF associated with the STA may also be 64 bits.

The synchronization process may begin at 902 with the STA 106 receiving a sync frame. The sync frame may have a partial TSF time of least significant bits (LSB) of the TSF time associated with the AP. For example, the partial TSF time may be 12 bits which correspond to [0:11] of the STA TSF. At 904, a determination is made by the STA 106 whether a difference between the least significant bits TSF time associated with the STA TSF (e.g., [0:11]) and the partial TSF time (e.g., 12 bits) is greater than ½ of a maximum partial TSF time, e.g., the most significant bit of the TSF time of the least significant bits TSF time and the partial TSF time are different. For example, a partial TSF time may be 12 bits and ½ the maximum partial TSF time may be $\frac{1}{2}*2^{12}=2^{11}$. If the difference between the least significant 12 bit TSF time associated with the STA and the 12 bit partial TSF time is less than/equal to ½ of a maximum partial TSF time, then at 904, the most significant 52 bits of the TSF associated with the STA TSF (e.g., [12:63]) is not changed and processing proceeds to 908 described below. If the difference between the least significant bits TSF time associated with the STA (e.g., [0:11]) and the partial TSF time is greater than ½ of a maximum partial TSF time, then at 906, a determination is made by the STA 106 whether the partial TSF is less than, greater than, or equal to the least significant bits of the TSF time associated with the STA (e.g., [0:11]). If the partial TSF is less than the least significant bits of the TSF time associated with the STA (e.g., [0:11]), then at 912 the most significant bits of the TSF time associated with the STA TSF (e.g., [12:63]) may be increased by one by the STA 106. If the partial TSF is greater than the least significant bits of the TSF time associated with the STA (e.g., [0:11]), then at 910 the most significant bits of the TSF time associated with the STA TSF (e.g., [12:63]) may be decreased by one by the STA 106. If the partial TSF is equal to the least significant bits of the TSF time associated with the STA (e.g., [0:11]), then the most significant bits of TSF time are not changed. At 908, the partial TSF time is copied into the LSB of the TSF associated with the STA TSF [0:11] by the STA 106. In this manner, the TSF associated with the AP and STA are synchronized when the TSF associated with the STA drift by more than half of a maximum partial TSF time. Any drift less than this amount will be accounted for when the partial TSF time is copied into the LSB of the TSF associated with the STA at 908 without further change to the MSBs of the TSF associated with the STA.

To illustrate application of the functions 900, suppose the interval between two low power wakeup request frames is 1 ms. Further, assume that the STA's clock is faster, i.e. if AP TSF time is increased by 1 ms, STA TSF time is increased by 1 ms+50 us. After STA sets its TSF time per the received (n−1) th low power wakeup request frame, both AP and STA TSF time have the same value with TSF[12:63]= 0x123456789ABCD and TSF[0:11]=0xDF8. When transmitting nth low power wakeup request frame after 1 ms, AP TSF time's MSB 52 bits and LSB 12 bits are TSF[12:63]= 0x123456789ABCD, TSF[0:11]=0xFF8. Right before receiving the nth low power wakeup request frame, STA's TSF time's MSB 52 bits and LSB 12 bits are TSF[12:63]= 0x123456789ABCE, TSF[0:11]=0x012 which is 50 us faster than the AP TSF time. After the reception of nth low power wakeup request frame, the STA TSF time's MSB 52 bits and LSB 12 bits should be TSF[12:63]= 0x123456789ABCD, TSF[0:11]=0xFF8. This is the example that STA's TSF [12:63] is decreased by 1 when the partial TSF time [0:11] is copied into the TSF associated with the STA.

If the partial TSF takes the form of bits 4:15 of the TSF time of the AP rather than bits [0:11] of the TSF time of the AP, then the most significant bits of the TSF time associated with the STA will be TSF[16:63] instead of TSF[12:63] in the functions 900. Further, the least significant bits of the TSF time associated with the STA may be TSF[0:15] and the max partial TSF time will be ½ of $2^{16}$ or $2^{15}$ in the functions 900. The partial TSF may take other bit lengths as well or groups of bits within the TSF time. Further, if the time drift indicated by the partial TSF time in successive sync frames is greater than ½ the maximum partial TSF time, then the AP may send an 802.11 beacon or probe request via the 802.11 radio with a full TSF time rather than a partial TSF time. For example, if a most significant bit of successive sync frames changes from a 0 to 1 or 1 to 0, then the AP may send an 802.11 beacon or probe request via the 802.11 radio with a full TSF time for updating the TSF. The full TSF time may be 64 bits. Other variations are also possible.

A few implementations have been described in detail above, and various modifications are possible. For example, functions performed at the STA described above may also be additionally or alternatively performed at the AP. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
    determining, by a first wireless device and while a first and second wireless transceiver are powered off, start of a service period (SP) interval based on a timing function;
    turning on the first wireless transceiver in response to the determination of the start of the service period to enable the first wireless device to establish communication with a second wireless device via a low power (LP) wireless channel while the second wireless transceiver is powered off;
    receiving, by the first wireless device, a request frame from the second wireless device; and
    updating a time of the timing function based on the request frame.

2. The method of claim 1, wherein the request frame is a low power wakeup frame.

3. The method of claim 2, wherein receiving, by the first wireless transceiver, the request frame comprises periodically receiving the request frame.

4. The method of claim 1, wherein a format of the request frame comprises a timing function time field.

5. The method of claim 4, wherein the time of the timing function is represented as first bits having a most significant and least significant portion; wherein a time in the timing function time field is represented as second bits, wherein a number of the first bits is greater than a number of the second bits.

6. The method of claim 5, further comprising determining whether a difference between the least significant portion and the time in the timing function time field is greater than or less than one half of a maximum time represented by the timing function time field;
    based on the difference being greater than one half of the maximum time, determining whether the time in the timing function time field is less than or greater than the least significant portion and respectively incrementing or decrementing most significant bits of the time of the timing function; and
    replacing the least significant portion with the time in the timing function time field.

7. The method of claim 1, wherein the first wireless transceiver is a low power radio and the second wireless transceiver is an 802.11 radio.

8. The method of claim 1, wherein the timing function is a first timing function and wherein updating the time of the timing function comprises:
    recording a first time when the request frame is received based on the first timing function;
    turning on the second wireless transceiver in response to receiving the request frame, wherein turning on the second wireless transceiver enables the first wireless device to receive an additional frame from the second wireless device;

receiving, by the second wireless transceiver, the additional frame, wherein the additional frame defines a second time when the request frame was sent based on a second timing function associated with the second wireless device; and adjusting the time of the first timing function based on a difference between the first time and the second time.

9. The method of claim 1, wherein the second wireless transceiver is an Institute of Electrical and Electronics Engineers (IEEE) 802.11 compliant radio and the first wireless transceiver is a lower power radio that is 802.11 compliant.

10. The method of claim 1, further comprising powering on the second wireless transceiver in response to receiving the request frame, and wherein updating the timing function comprises receiving a time announcement via the second wireless transceiver and updating the time of the timing function based on the time announcement.

11. The method of claim 1, wherein the second wireless transceiver is an Institute of Electrical and Electronics Engineers (IEEE) 802.11 compliant radio, the method further comprising turning on the 802.11 radio and receiving an indication of the SP interval in an 802.11 frame.

12. Apparatus comprising:
a local timing function;
a processor;
memory;
program code stored in the memory and executable by the processor to perform one or more functions which include:
based on the local timing function, determining start of a service period (SP) interval at a wireless device, wherein the wireless device powers on a first wireless transceiver of the wireless device in response to the start of the service period interval to enable the wireless device to establish communication with the apparatus via a low power (LP) wireless channel while a second wireless transceiver of the wireless device is powered off; and
sending a request frame to the wireless device to cause the wireless device to update a time of a remote timing function associated with the wireless device based on the request frame.

13. The apparatus of claim 12, wherein the request frame is a low power wakeup frame.

14. The apparatus of claim 12, wherein the program code to send the request frame comprises program code to periodically send the request frame.

15. The apparatus of claim 12, wherein a format of the request frame comprises a timing function time field.

16. The apparatus of claim 15, wherein the time of the remote timing function is represented as first bits having a most significant and least significant portion; wherein a time in the timing function time field is represented as second bits, wherein a number of the first bits is greater than a number of the second bits.

17. The apparatus of claim 16, wherein the program code to send the request frame causes the wireless device to:
determine whether a difference between the least significant portion and the time in the timing function time field is greater than or less than one half of a maximum time represented by the timing function time field;
based on the difference being greater than one half of the maximum time, determine whether the time in the timing function time field is less than or greater than the least significant portion and respectively incrementing or decrementing most significant bits of the time of the remote timing function; and
replace the least significant portion with the time in the timing function time field.

18. The apparatus of claim 16, further comprising program code to send an indication of the service period based on an Institute of Electrical and Electronics Engineers (IEEE) 802.11 compliant frame.

19. An apparatus comprising:
a first wireless transceiver;
a second wireless transceiver;
circuitry configured to:
determine, by a first wireless device and while the first and the second wireless transceiver are powered off, start of a service period (SP) interval based on a timing function;
turn on the first wireless transceiver in response to the determination of the start of the service period to enable the first wireless device to establish communication with a second wireless device via a low power (LP) wireless channel while the second wireless transceiver is powered off;
receive, by the first wireless device, a request frame from the second wireless device; and
update a time of the timing function based on a time in a timing function time field of the request frame.

20. The apparatus of claim 19, wherein the time of the timing function is represented as first bits having a most significant and least significant portion; wherein the time in the timing function time field is represented as second bits, wherein first bits are greater than second bits, and wherein the circuitry further comprises circuitry configured to determine whether a difference between the least significant portion and the time in the timing function time field is greater than or less than one half of a maximum time represented by the timing function time field; based on the difference being greater than one half of the maximum time, determine whether the time in the timing function time field is less than or greater than the least significant portion and respectively increment or decrement most significant bits of the time of the timing function; and replace the least significant portion with the time in the timing function time field.

* * * * *